Patented Feb. 21, 1933                                                                    1,898,275

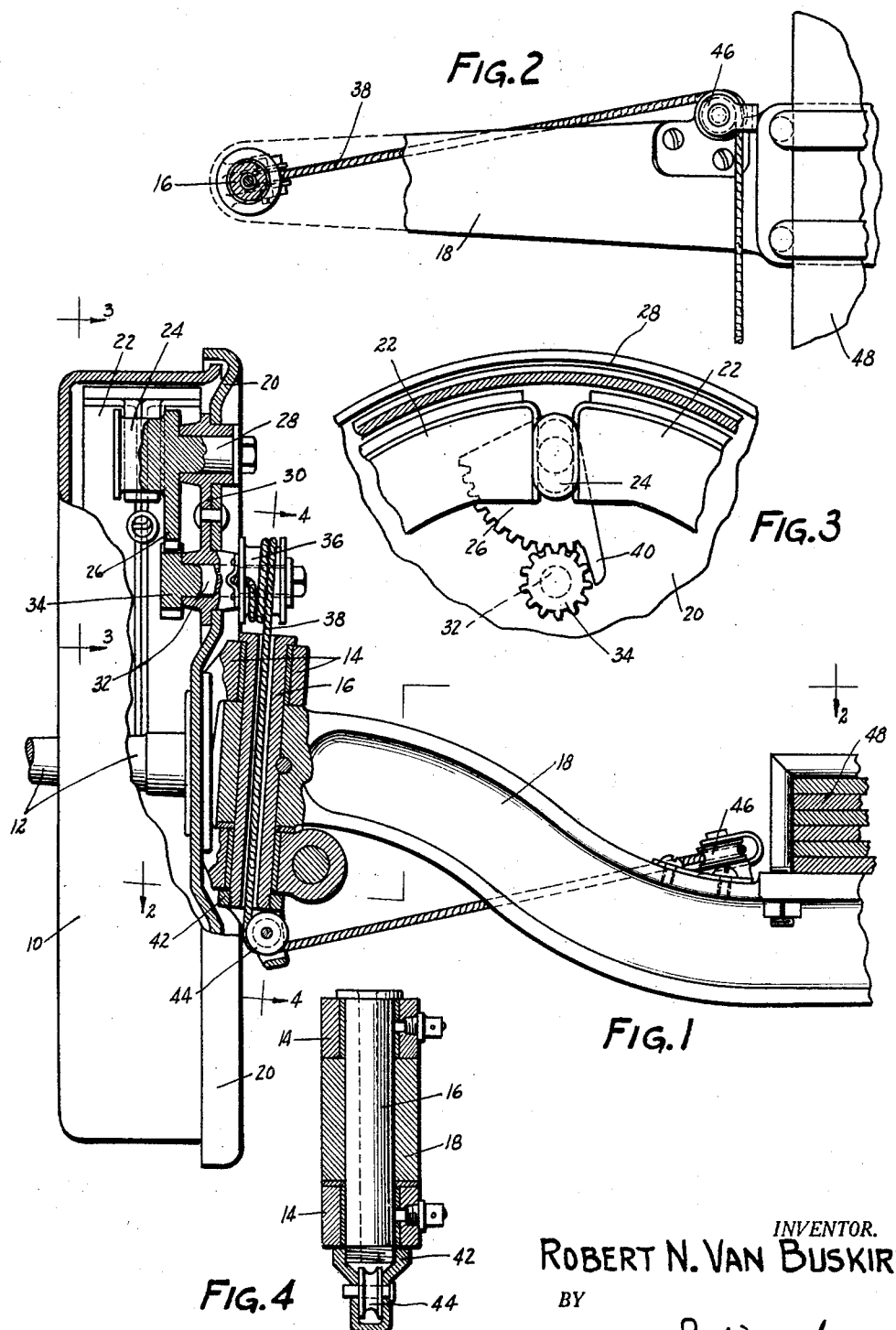

UNITED STATES PATENT OFFICE

ROBERT N. VAN BUSKIRK, OF DETROIT, MICHIGAN, ASSIGNOR TO BENDIX BRAKE COMPANY, OF SOUTH BEND, INDIANA, A CORPORATION OF ILLINOIS

BRAKE OPERATING MEANS

Application filed July 27, 1928. Serial No. 295,677.

This invention relates to brakes, and is illustrated as embodied in novel operating mechanism for a front-wheel automobile brake. An object is to provide simple and inexpensive operating means, preferably of a type which does not interfere with the swiveling of the wheel in steering.

In one desirable arrangement, the operating means includes an applying device operating the brake friction means, and which is illustrated as embodying novel rack-and-pinion means, and which preferably includes a rotatable pulley operated by a flexible tension element such as a cable secured at its end to the pulley and wrapped around the pulley. The cable or its equivalent may have a portion extending along the swiveling axis of the wheel, for example through a hollow kingpin, so that it does not interfere with the swiveling of the wheel.

The above and other objects and features of the invention, including various novel and desirable details of construction, will be apparent from the following description of the illustrative embodiment shown in the accompanying drawing, in which:

Figure 1 is a view partly in rear elevation and partly in transverse vertical section, showing the left front brake;

Figure 2 is a horizontal section on the line 2—2 of Figure 1;

Figure 3 is a partial vertical section on the line 3—3 of Figure 1, showing the brake-applying device in elevation; and Figure 4 is a section through the kingpin, on the line 4—4 of Figure 1.

The brake selected for illustration includes a drum 10, rotating with a wheel (not shown) rotatably mounted on the spindle 12 of a front wheel knuckle 14 swiveled by a novel hollow kingpin 16 at one end of the front axle 18. A support, such as a backing plate 20 bolted to the knuckle 14, is arranged at the open side of the drum. Brake shoes 22, or equivalent friction means, are arranged inside of the drum.

The brake is operated by an applying device such as a double cam 24 engaging the shoes, and shown as formed in one piece with a novel rack 26 arranged inside the drum, and with a spindle or camshaft 28 journaled in a bracket 30 secured to the backing plate. The bracket 30 also serves as a bearing for a shaft or spindle 32, having at its drum end a pinion 34 meshing with rack 26, and having at its opposite end outside the backing plate novel operating means such as a pulley 36. A flexible tension element such as a cable 38 is secured at its end to the pulley and is wrapped around the pulley, so that pulling the cable lengthwise operates the intergeared rack and pinion to apply the brake. Rack 26 preferably has a stop projection 40 engaging the pinion 34 when the brake is released.

In order to avoid interference with the swiveling of the wheel, a portion of cable 38 extends through the novel hollow kingpin 16, i. e. along the swiveling axis of the wheel. A retaining nut 42 threaded on the lower end of the kingpin, and holding the kingpin assembly together, is extended downwardly to form a support for a sheave or idler pulley 44, over which cable 38 passes, and which is accordingly substantially tangent to the kingpin axis. Another sheave or idler pulley 46 is shown mounted adjacent the vehicle spring 48.

While one illustrative embodiment has been described in detail, it is not my intention to limit its scope to that particular embodiment, or otherwise than by the terms of the appended claims.

I claim:

1. A brake having an operating device and a rotatable pulley geared to said device, in combination with a flexible tension element secured at one end to the pulley and wrapped around the pulley and pulled lengthwise in applying the brake to rotate the pulley.

2. A vehicle having an axle and a knuckle connected by a hollow kingpin, in combination with a brake carried by the knuckle and having operating means including a rotatable pulley supported by the knuckle, and a flexible tension element secured at one end to the pulley and wrapped around the pulley and passing through the hollow kingpin.

3. A vehicle having an axle and a knuckle swiveled thereto, in combination with a brake carried by the knuckle and having operating means including a rotatable pulley supported by the knuckle, and a flexible tension element secured at one end to the pulley and wrapped around the pulley and having a portion extending along the swiveling axis of the knuckle.

4. A brake having an applying device provided with a segmental rack, in combination with a pinion meshing with the rack and having connected thereto a rotatable pulley, and a flexible tension element secured at its end to the pulley and wrapped around the pulley, the rack having a stop projection engaging the pinion when the brake is released.

5. A kingpin assembly for a dirigible automobile wheel having a hollow kingpin with a retaining nut threaded on its end and carrying an idler pulley engageable with a flexible tension element passing through the hollow kingpin.

6. A kingpin assembly for a dirigible automobile wheel having a hollow kingpin with a retaining nut threaded on its end and carrying an idler pulley substantially tangent to the king pin axis.

7. A brake having, in combination, a drum, friction means within the drum, and an applying device for operating the friction means comprising a rack having a stop projection at one end of its arc for limiting the released position of said friction means.

8. A brake having in combination, a drum; a backing plate at the open side of the drum; friction means within the drum; an applying device, comprising a spindle carried by the backing plate and provided with a segmental rack arranged inside of the drum and having a stop projection at one end of its arc for operating the friction means; and a spindle supported by the backing plate and having a pinion meshing with the rack, said last named spindle extending through the backing plate and having operating means outside of the backing plate.

9. In a device of the character described, an axle, a brake drum associated with said axle, friction means within the drum, a hollow king pin rigidly secured to said axle, an idler pulley carried by said king pin, and means for applying the friction means to the drum including a flexible tension element engageable with said idler pulley and passing through the hollow king pin.

10. A brake system comprising, in combination, an axle; a hollow king pin associated with said axle; means comprising a locking pin for securing said king pin rigidly to said axle; a knuckle mounted for turning movement upon said king pin; a rotatable brake drum, associated with said axle; a brake shoe carried by said knuckle; operating means for said brake shoe including a rotatable pulley supported by said knuckle, a flexible tension element secured at one end to the pulley and passing through the hollow king pin; and an idler pulley carried by said hollow king pin substantially tangent to the king pin axis, over which said tension element passes.

In testimony whereof, I have hereunto signed my name.

ROBERT N. VAN BUSKIRK.